United States Patent Office 3,135,779
Patented June 2, 1964

3,135,779
PROCESS FOR PREPARING ORTHO-AMINOPHE-
NOL-β-HYDROXYETHYLSULFONE SULFURIC
ACID ESTERS
Ernst Hoyer, Frankfurt am Main, and Walter Noll, Bad
Soden, Taunus, Germany, assignors to Farbwerke
Hoechst Aktiengesellschaft vormals Meister Lucius &
Brüning, Frankfurt am Main, Germany, a corporation
of Germany
No Drawing. Filed Oct. 3, 1961, Ser. No. 142,528
Claims priority, application Germany Oct. 6, 1960
4 Claims. (Cl. 260—457)

It is known that ortho-aminophenol-β-hydroxyethyl-sulfone sulfuric acid esters of the formula

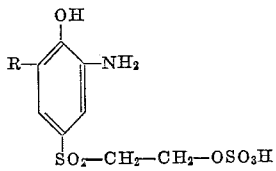

in which R represents a hydrogen atom or a nitro group, can be prepared by esterifying the corresponding ortho-aminophenol-β-hydroxyethylsulfones of the formula

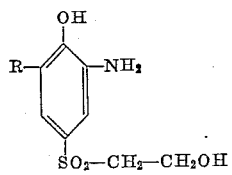

in which R has the meaning given above, in an excess of sulfuric acid of high concentration at a temperature ranging for example from 30° C. to 35° C. (cf. German Patent 938,145).

Prior to the esterification in sulfuric acid, however, this process requires a separation and drying operation of the ortho-aminophenol-β-hydroxyethylsulfones which in many cases, due to the extremely high solubility in water of many of these substances and their liability to decompose relatively easily may involve considerable losses in yield.

Now we have found that by treating β-hydroxyethyl-sulfonylbenzoxazolones of the general formula

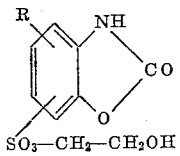

in which R represents a hydrogen or halogen atom, an alkyl, amino or nitro group, with highly concentrated sulfuric acid, preferably of 85% to 95% strength, at a raised temperature, suitably between about 110° C. and 160° C., there are obtained in an excellent yield the corresponding ortho-aminophenol-β-hydroxyethylsulfone sulfuric acid esters of the general formula

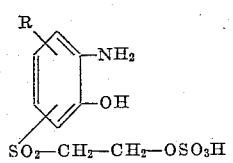

in which R has the meaning given above. The new process differs advantageously from that described in German Patent 938,145 in that the separation of the free ortho-aminophenol-β-hydroxyethylsulfones is not necessary. The β-hydroxyethyl-sulfonyl-benzoxazolones used as starting materials are distinguished from the ortho-aminophenol-β-hydroxyethylsulfones by their substantially lower solubility in cold aqueous media and their considerably lower sensitiveness to oxidation by which the losses in yield occurring at the isolation of the free ortho-aminophenol - β - hydroxyethylsulfones can largely be avoided. The new process, therefore, represents a considerable technical advance.

The ortho-aminophenol-β-hydroxyethylsulfone sulfuric acid esters which can be prepared by the process of the present invention are obtained with a very good yield in aqueous solution. In some cases they can also be separated in solid form with a good yield.

The β-hydroxyethylsulfonyl-benzoxazolones used as starting products in the process of the present invention can, for instance, be prepared by reducing ortho-nitrophenol-β-hydroxyethylsulfones which may contain substituents and reacting the alkaline reaction mixtures with phosgene, or by reducing benzoxazolone-sulfochlorides which may contain substituents to obtain the corresponding sulfinic acids and reacting these compounds, for example, with β-chloroethyl alcohol. The benzoxazolones can also be prepared by demethylating ortho-anisidine-β-hydroxyethylsulfones which may be substituted and reacting the dissolved ortho-aminophenol-β-hydroxyethylsulfones with phosgene. Furthermore, aminobenzoxazolone-β-hydroxyethylsulfones can be prepared by catalytic reduction of the corresponding nitrobenzoxazolone-β-hydroxyethylsulfones.

The ortho-aminophenol-β-hydroxyethylsulfone sulfuric acid esters obtainable by the process of the present invention can be used for the manufacture of dyestuffs, particularly metallizable azo-dyestuffs, by diazotization and coupling with suitable coupling components.

The following examples serve to illustrate the invention but they are not intended to limit it thereto, the parts being by weight unless otherwise stated, and the relationship of parts by weight to parts by volume being the same as that of the kilogram to the liter.

EXAMPLE 1

48.6 parts of 5-(β-hydroxyethylsulfonyl)-benzoxazolone melting at 184° C. and corresponding to the formula

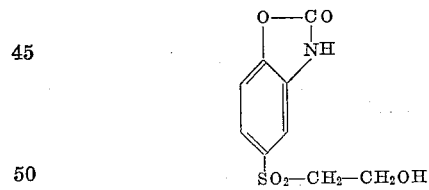

are introduced, at a temperature ranging from 70° C. to 80° C., into 130 parts of sulfuric acid of 90% strength and stirred first for 90 minutes at a temperature within the range of 145° C. to 150° C. and then for 30 minutes at a temperature ranging from 153° C. to 156° C. After cooling, the reaction mixture is poured onto 400 parts of ice, and a solution of 108 parts of sodium carbonate in 360 parts by volume of water is added dropwise at a temperature ranging from 0° C. to 5° C. The mixture is then rendered neutral by introducing 21 parts of whitening and filtered at 15° C.

The clear neutral solution contains 57.9 parts of 2-aminophenol-4-β-hydroxyethylsulfone sulfuric acid ester. There are obtained 97.5% of the theoretical yield.

When in Example 1 instead of 5-(β-hydroxyethylsulfonyl)-benzoxazolone the quantities of the β-hydroxyethylsulfonyl-benzoxazolones cited in the following table are used, there are obtained the corresponding ortho-aminophenol-β-hydroxyethylsulfone sulfuric acid esters the yields of which are indicated in the last column of the table.

| Quantity used in parts by weight | β-hydroxyethylsulfonylbenz-oxazolone of the formula | Melting point | Yield in percent of the theory |
|---|---|---|---|
| 57.6 | O₂N–[benzoxazolone with O–CO, NH, SO₂–CH₂–CH₂OH] | 244° C. to 246° C. (with decomposition). | 86 |
| 51.6 | H₂N–[benzoxazolone with O–CO, NH, SO₂–CH₂–CH₂OH] | 240° C. (with decomposition) | 97.5 |
| 48.6 | [benzoxazolone with NH–CO, O, SO₂–CH₂–CH₂OH] | 205° C | 93 |
| 55.5 | Cl–[benzoxazolone with NH–CO, O, SO₂–CH₂–CH₂OH] | 218° C | 96 |
| 64.4 | Br–[benzoxazolone with O–CO, NH, SO₂–CH₂–CH₂OH] | 253° C. to 254° C | 97 |
| 51.4 | CH₃–[benzoxazolone with NH–CO, O, SO₂–CH₂–CH₂OH] | 178° C. to 180° C | 95 |

EXAMPLE 2

48.6 parts of 6-(β-hydroxyethylsulfonyl)-benzoxazolone melting at 205° C. are introduced, at a temperature ranging from 70° C. to 80° C., into 130 parts of sulfuric acid of 90% strength and the whole is stirred for 5 hours at a temperature ranging from 135° C. to 140° C. After cooling, the mixture is poured onto 400 parts of ice. The sulfuric acid solution obtained contains 54.9 parts of 2-aminophenol-5-β-hydroxyethylsulfone sulfuric acid ester which corresponds to 92.5% of the theoretical yield.

EXAMPLE 3

24.3 parts of 5-(β-hydroxyethylsulfonyl)-benzoxazolone having a melting point of 184° C. are introduced at a temperature ranging from 70° C. to 80° C. into 65 parts of sulfuric acid of 95% strength and the temperature is kept for 2 hours at 145° C. to 155° C. After cooling, the mixture is poured onto 200 parts of ice, and a solution of 57 parts of sodium carbonate in 185 parts by volume of water is then added dropwise at a temperature ranging from 0° C. to 5° C. The whole is neutralized with about 15 parts of calcium carbonate and then filtered off.

The filtrate contains 28.9 parts of 2-aminophenol-4-β-hydroxyethylsulfone sulfuric acid ester which corresponds to 97.5% of the theoretical yield.

EXAMPLE 4

24.3 parts of 5-(β-hydroxyethylsulfonyl)-benzoxazolone are introduced, at a temperature ranging from 70° C. to 80° C., into 65 parts of sulfuric acid of 95% strength and the whole is stirred for 2 hours at 145° C. to 155° C. After cooling, the mixture is poured onto 150 parts of ice and stirring is continued for about 60 minutes, while cooling. The precipitated 2-aminophenol-4-β-hydroxyethylsulfone sulfuric acid ester is filtered off, washed with acetone and ether and then dried under vacuo.

The crystalline product isolated in this manner amounts to 20 parts. In the mother liquor there are dissolved further 8.8 parts of 2-aminophenol-4-β-hydroxyethylsulfone sulfuric acid ester. The total yield, therefore, amounts to 97% of the theory.

We claim:
1. Process for preparing ortho-aminophenol-β-hydroxyethylsulfone sulfuric acid esters which comprises heating

β-hydroxyethylsulfonyl-benzoxazolones of the following formula

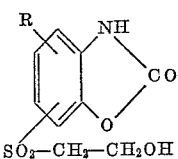

in which R represents a member selected from the group consisting of hydrogen, bromine, chlorine, methyl, amino and nitro, with concentrated sulfuric acid of about 85% to 95% strength at a temperature between about 110° C. and 160° C.

2. Process as claimed in claim 1, wherein 6-(β-hydroxyethylsulfonyl)-benzoxazolone of the formula

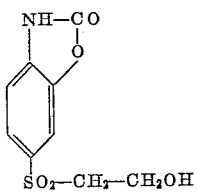

is used as starting material.

3. Process as claimed in claim 1, wherein 6-(β-hydroxyethylsulfonyl)-5-chloro-benzoxazolone of the formula

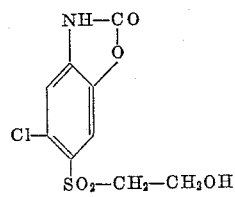

is used as starting material.

4. Process as claimed in claim 1, wherein 6-(β-hydroxyethylsulfonyl)-5-methyl-benzoxazolone of the formula

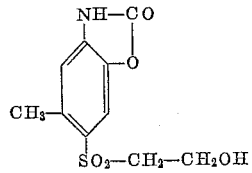

is used as starting material.

References Cited in the file of this patent

FOREIGN PATENTS 938,145    Germany _____ Jan. 26, 1956

OTHER REFERENCES

Scudi et al., Jour. Am. Chem. Soc., Vol. 63, p. 879 (1941), QD 1 A5.